United States Patent [19]

Herbert

[11] 4,198,078
[45] Apr. 15, 1980

[54] PRESSURIZED VIBRATION ISOLATOR

[75] Inventor: John T. Herbert, Horton, Mich.

[73] Assignee: Aeroquip Corporation, Jackson, Mich.

[21] Appl. No.: 924,937

[22] Filed: Jul. 17, 1978

[51] Int. Cl.² .................... F16L 27/02; F16L 27/10; F16L 55/00; F16L 55/02
[52] U.S. Cl. ........................................ 285/49; 285/54; 285/223; 285/234
[58] Field of Search .................. 285/49, 54, 234, 237, 285/223, 261, 235; 248/358 R; 277/30

[56] References Cited

U.S. PATENT DOCUMENTS

| | | | |
|---|---|---|---|
| 2,273,395 | 2/1942 | Couty | 285/261 X |
| 2,354,538 | 7/1944 | Parker | 285/234 |
| 2,396,078 | 3/1946 | Box | 285/261 X |
| 2,445,578 | 7/1948 | Howe | 285/234 |
| 2,922,483 | 1/1960 | Harris | 248/358 R |
| 3,079,277 | 2/1963 | Painter | 248/358 R |
| 3,390,899 | 7/1968 | Herbert et al. | 285/45 |
| 3,680,895 | 8/1972 | Herbert et al. | 285/167 |
| 3,734,546 | 5/1973 | Herbert et al. | 285/49 |
| 3,756,551 | 9/1973 | Bishop | 248/358 R |
| 3,853,337 | 12/1974 | Herbert et al. | 285/49 |
| 4,068,864 | 1/1978 | Herbert et al. | 285/234 |
| 4,076,284 | 2/1978 | Herbert et al. | 285/223 X |
| 4,103,939 | 8/1978 | Herbert et al. | 285/234 X |

FOREIGN PATENT DOCUMENTS

| | | | |
|---|---|---|---|
| 472773 | 9/1937 | United Kingdom | 285/234 |
| 542208 | 12/1941 | United Kingdom | 285/49 |

Primary Examiner—William M. Schultz
Assistant Examiner—Carl F. Pietruszka
Attorney, Agent, or Firm—Beaman & Beaman

[57] ABSTRACT

The invention pertains to a vibration and sound isolator for pressurized conduit systems, such as refrigeration systems, capable of absorbing torsional and bending vibrations without fluid leakage. An annular cylinder casing defines a chamber receiving a tubular piston member having a head located within the chamber. The chamber is axially defined by a pressure face wall at one end, and a reaction wall at the other end. An annular elastomeric seal bonded to the piston head and reaction wall is compressed by fluid pressure acting upon the pressure face wall and piston head increasing the elastomer's resistance to fluid permeability. The axial dimension of elastomer intermediate the piston head and reaction wall permits torsional deflection between the cylinder and piston members about an axis coincident with fluid connection means defined upon the members, and radial clearance between the piston stem and elastomer permits related angular deflection of the members while maintaining a sealed relationship. The elastomer may be stiffened to resist axial deflection by embedding rings, fibers, and plate-like granules within the elastomer, preferably oriented such that the plane thereof is perpendicularly disposed to the torsional axis, and such material also produces a resistive path relative to fluid permeability.

10 Claims, 5 Drawing Figures

PRESSURIZED VIBRATION ISOLATOR

SUMMARY OF THE INVENTION

The invention pertains to vibration and sound insulators for pressurized conduit fluid systems.

Fluid systems utilizing rigid conduits such as pipe, copper or aluminum tubing, or the like are often subject to mechanical vibrations which, if not absorbed or damped, may cause conduit failure due to metal fatigue and produce undesirable noise. For instance, serious vibration problems exist in automotive air conditioning systems wherein the refrigerant compressor is mounted upon the resiliently supported engine and vibrates with the engine, while the air conditioner evaporator and other apparatus is fixed upon stationary portions of the vehicle. The fact that the motor, and compressor, are mounted upon elastomer engine mounts to absorb engine vibrations permits considerable movement of the refrigeration conduit system associated with the compressor relative to those portions of the conduit system attached to the vehicle chassis, and it has been the practice to utilize flexible couplings or vibration damping couplings to interconnect the relatively movable portions of the refrigeration conduit circuit.

In the conduit arts it is known to utilize flexible joints and connections wherein assembled conduits are capable of relative limited rotational or bending displacement while maintaining the integrity of the system, and in my U.S. Pat. Nos. 3,390,899; 3,680,895; 3,734,546; 4,068,864 and 4,076,284 various arrangements of couplings are illustrated for permitting relative movement between connected conduits.

Sound and vibration isolators used in automotive air conditioning conduit systems must be highly dependable, have a long effective service life, be capable of withstanding elevated temperatures and significant deflection and deformation forces, and yet be of relatively inexpensive construction. It is the basic object of the invention to provide a vibration and sound isolator capable of meeting the aforegoing criteria.

Another object of the invention is to provide a vibration and sound isolator which may be readily incorporated into a conduit system for pressurized fluids, such as hydraulic, pneumatic and refrigeration systems, wherein the isolator is of concise configuration and is capable of effectively absorbing significant torsional and bending vibrations without decreasing sealing efficiency.

Yet an additional object of the invention is to provide a vibration and sound isolator for pressurized fluid systems wherein vibrations are absorbed within an elastomer, and the permeability of the elastomer to fluid penetration decreases proportionally with the increase in pressure of the fluid therein.

Another object of the invention is to provide a vibration and sound isolator for pressurized fluid systems utilizing an elastomer vibration absorbing component, stiffening means being embedded within the elastomer to increase the elastomer's resistance to axial deflection, and also produce a devious flow path for fluid penetrating the seal as to decrease the permeability of the elastomer.

In the practice of the invention a cylinder casing member communicates with a tubular conduit connection portion coaxial with the cylinder. A conduit may be attached to the conduit connection portion of the cylinder by conventional means such as soldering, or by other known fitting constructions. The cylinder includes an inner pressure face wall perpendicularly disposed to the cylinder axis, and the cylinder is originally open at one end to permit installation of a piston member and reaction wall.

A piston member of an elongated tubular form includes a head at one end formed by a radially disposed annular flange positioned in axially spaced opposed relationship to the cylinder pressure face wall and a conduit connection stem portion at the other end. The open end of the cylinder member is closed by an annular reaction wall transversely disposed to the cylinder member axis, and an elastomer seal and vibration damping member is interposed between the piston member head and the cylinder reaction wall, and is bonded thereto. Radial clearance exists between the inner dimension of the elastomer and the cylindrical stem of the piston member wherein the elastomer is only bonded to the piston member adjacent the head.

The aforedescribed construction permits relative torsional deflection between the cylinder and piston members about the axis of the respective connection conduit portions in view of the axial spacing between the piston member head and the reaction wall. Also, angular deflection between the cylinder and piston members relative to the isolator axis, within limits, is permitted by the elastomer, and, preferably, a portion of the elastomer is interposed between the inner edge of the reaction wall and the piston member stem to act as a bumper and cushion against "fretting" and sound transmission between the isolator components.

While the elastomer engages the cylinder member pressure face wall, the pressure face wall will be exposed to the internal pressure of the isolator, and such pressure will act against the elastomer bonded to the piston head biasing the piston member in an axial direction away from the pressure face wall, and such axial movement of the piston member, while slight, will compress the elastomer intermediate the piston member head and the cylinder reaction wall closing the voids within the elastomer and decrease the permeability to the fluid within the vibration isolator. Thus this axial movement of the piston member will automatically decrease the elastomer permeability proportionate to the pressure of the fluid within the system incorporating the vibration isolator.

Vibration and sound isolators of the aforedescribed type when used with automotive air conditioning systems are subjected to high torsional vibrations about the isolator longitudinal axis, and to permit the isolator to effectively absorb such torsional forces, yet have an extended service life, and also effectively absorb axial bending forces, it is of advantage to embed stiffening means within the elastomer so oriented as to permit maximum absorption of torsional vibrations yet stiffen the elastomer to resist axial deflection and movement. For this purpose the stiffening means may consist of annular metal rings embedded within the elastomer, or may include plate-like granules such that the planes of the rings or plates are transversely disposed to the vibration isolator axis. Also, elongated fibers of synthetic plastic materials may be utilized as stiffeners as well as glass fibers or granules of nylon or the like. Such fillers utilized within the elastomer also decrease the permeability of the elastomer against pressurized fluids in that a more devious fluid path through the elastomer results.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
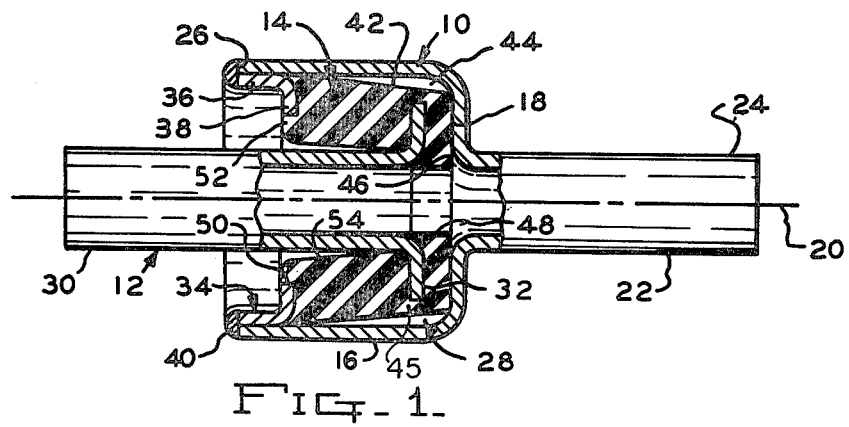
FIG. 1 is a diametrical, elevational, cross sectional view of a vibration and sound isolator in accord with the invention wherein an elastomer is utilized without oriented stiffening means.

In the four embodiments illustrated in the drawing identical components are identified by the same reference numeral, and the vibration and sound isolator in accord with the inventive concepts basically consists of a cylinder or casing member generally indicated at 10, a piston member generally indicated at 12, and an elastomer vibration absorbing member and seal generally indicated at 14.

The cylinder member 10 includes the cylindrical wall portion 16, a pressure face wall 18 perpendicularly disposed to the isolator longitudinal axis 20, and a conduit section 22 communicates with the wall 18 defining an end 24 which may be soldered or otherwise attached to the conduit system which the isolator is utilized, not shown. The cylinder member 10 also includes an open end generally indicated at 26. The wall 16 defines a cylindrical chamber 28 which receives the piston member head and elastomer, as later described.

The piston member 12 is of a tubular configuration including a cylindrical stem 30 which extends to the left as shown in the drawings, and to which a conduit of the conduit system incorporating the vibration isolator, not shown, may be soldered or otherwise affixed. The right end of the piston member is received within the cylinder chamber 28 and includes a flanged head 32 radially oriented to the axis 20, and of a radial dimension significantly less than the inner dimension of the cylinder wall 16. The internal dimension of the passage within the stem 30 substantially corresponds to the internal diameter of the passage within cylinder section 22, and as will be appreciated from the drawings, the alignment of these passages produces a restriction free fluid flow path through the isolator.

The open end 26 of the cylinder member is closed by a reaction wall member 34 which includes a cylindrical portion 36 engaging the inner surface of the cylinder wall 16, and a wall portion 38 radially disposed to the axis 20 and in spaced opposed relation to the pressure face wall 18. The reaction wall member 34 is permanently affixed to the open end 26 by a continuous weld bead 40 producing a fluid tight connection between the reaction wall and cylinder members.

As the vibration isolator in accord with the invention is economically constructed the cylinder and piston member 10 and 12, respectively, and the reaction wall 34, are preferably formed of stamped metal which has been formed by high production techniques, and it will be appreciated that the configurations disclosed may be readily produced at low cost by known metal fabrication methods.

The interconnection between the cylinder and piston members 10 and 12 is achieved by the elastomer seal and vibration absorbing member 14 which is bonded to the piston member head 32, and the reaction wall portion 38. The member 14 is provided with a conical surface 42 at its outer dimension which is less than the inner dimension of the cylinder wall 16 wherein a void 44 exists within the chamber 28. The elastomer member 14 also includes a web 45 extending over the diameter of head 32 and also includes an end 46 which engages the pressure face wall 18, and an internal passage is defined in the elastomer member at 48 in alignment with the passages within the section 22 and stem 30.

The elastomer member 14 is also bonded to the reaction wall portion 38, and the reaction wall 34 includes an inner annular edge 50 extending toward the piston member stem 30. As will be appreciated from FIG. 1, the elastomer material extends inwardly of the edge 50 at 52, and is bonded thereto to function as a bumper to cushion the stem under axial angular bending deflection to prevent fretting. Also, it will be appreciated that the internal diameter of the elastomer as represented at 54 tapers from a minimum dimension at the piston head 32 to a maximum dimension at the edge 50 to provide clearance for the deflection of the piston member 12 relative to the cylinder member 10, and the fact that the elastomer is only bonded to the piston member at the head 32 permits significant torsional deflection of the piston member relative to the cylinder member without overstressing the elastomer.

In the embodiment of FIG. 1, the elastomer member 14, as in the other embodiments, preferably consists of a rubber-like material such as SBR synthetic rubber, natural rubber, neoprenes, nitriles or a urethane material. The elastomer may include granules and fillers which lower the fluid permeability characteristics of the elastomer, and also increase the stiffness thereof.

It will therefore be appreciated that the construction of the vibration isolator is such that rotational vibrations within the conduit system as imposed upon the members 10 and 12 will be absorbed by the elastomer as torsional vibrations of the cylinder member will be imparted to the elastomer through the reaction wall 34, and in view of the significant amount of elastomer between the reaction wall 34 and the piston head 32 the elastomer is capable of absorbing considerable torsion deflections and vibrations. As the configuration of the elastomer permits axial angular deflection of the piston member stem 30 relative to the axis 20 such bending forces will also be absorbed by the elastomer, and the elastomeric material bumper 52 at the reaction wall edge and the presence of web 45 will prevent metal-to-metal contact between the components even under extreme angular deflection. Accordingly, it will be appreciated that the isolator disclosed is capable of effectively absorbing rotational and bending vibrations simultaneously, or separately, and in view of the bonded, sealed relationship of the elastomer to the piston head 32 and reaction wall member 34 a high fluid tight integrity is achieved.

While the right end 46 of the elastomer member 14 engages the cylinder pressure face wall 18 the pressurized fluid within the isolator will seep along the wall 18 and fluid pressure will be imposed on the elastomer right end 46, and within the void 44. This pressure acting upon the elastomer at the wall 18 will bias the elastomer and piston member 12 toward the left, in FIG. 1, tending to compress the elastomer 14 intermediate the flanged head 32 and reaction wall portion 38. This biasing force will close the minute pores in the elastomer member and decrease the permeability of the elastomer to the pressurized fluid, such as Freon, either in a gaseous or liquid state.

As the radial outer dimension of the head 32 terminates well short of the inner diameter of the cylinder wall 16, and as the reaction wall edge 50 is radially spaced from the piston stem and protected by bumper 52 no metal-to-metal contact between the cylinder and piston members is possible and significant torsional and angular relative deflection between these components can occur without over stressing the components and producing acoustic reactions.

It is desirable that the isolator have a relatively low "stiffness" relative to rotative and angular vibrations about the axis 20, while vibrations tending to axially displace the members 10 and 12 relative to each other and the axis 20 be stiffly resisted, and to this end it is contemplated to employ stiffening elements within the elastomer to produce such physical characteristics. One type of elastomer stiffener is illustrated in the embodiment of FIG. 2.

Figure 2:
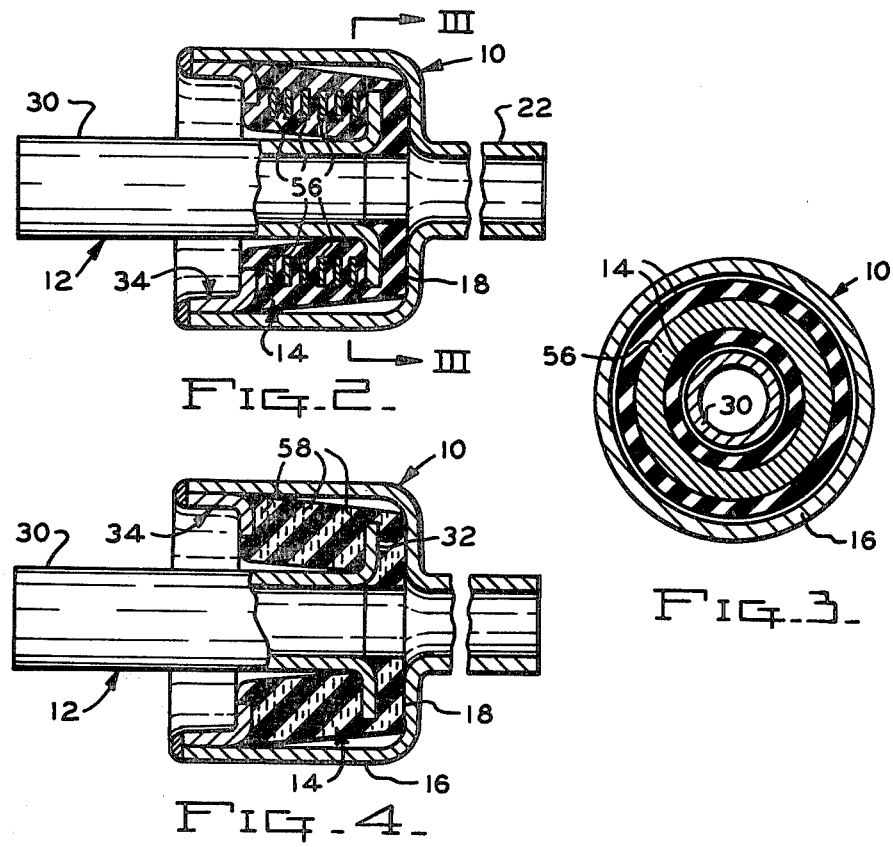
FIG. 2 is an elevational, sectional, diametrical view of an isolator embodiment in accord with the invention employing metal elastomer stiffening rings.
Figure 3:
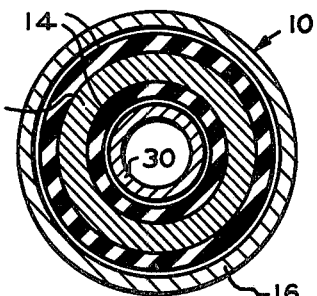
FIG. 3 is an elevational sectional view taken along Section III—III of FIG. 2.

In FIG. 2 components identical to those illustrated in FIG. 1 are indicated by like reference numerals, and the components are the same except for the presence of a plurality of annular metal rings 56 embedded within the elastomeric member 14 intermediate the flanged head 32 and reaction wall member 34. The metal rings 56 are preferably of the rectangular transverse cross sectional configuration as apparent in FIG. 2, and the rings are evenly axially spaced from each other and embedded into the elastomer during the formation thereof simultaneously with the bonding of elastomer to the piston member and the reaction wall member. The rings are concentric with the axis 20, and their presence will permit substantial relative rotative and angular displacement between the cylinder and piston members 10 and 12, respectively, about axis 20, yet the rings will produce significant resistance to relative axial movement of the members 10 and 12 since such axial displacement tends to compress the annular configuration of the elastomer, and the presence of the rings will resist such compression.

Figure 4:
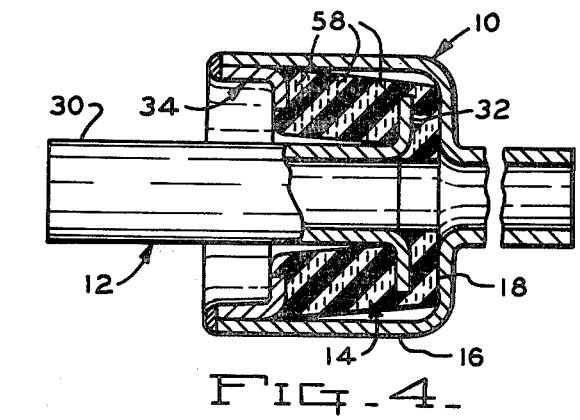
FIG. 4 is an elevational, diametrical, sectional view of another embodiment of the invention utilizing an elastomer having oriented plate-like granules of graphite or mica embedded therein.

Another means for stiffening the elastomer member against axial deflection while not adversely affecting the torsional vibration characteristics is illustrated in the embodiment of FIG. 4. In this embodiment components identical to those previously described are indicated by like reference numerals, and the only difference exists in the composition of elastomeric material.

In FIG. 4 the elastomer material includes a plurality of plate-like granules or particles 58 of graphite or mica wherein such particles are of a generally thin planar configuration. The particles 58 are oriented within the elastomeric material during the molding and bonding operation such that the plane of the majority of the particles are transversely disposed to the axis 20, preferably substantially perpendicularly disposed to the axis, and this orientation produces a functional operation similar to the rings of the embodiment of FIG. 2. The use of plate granules of graphite or mica in the elastomer also provides resistance to penetration of elastomer by the pressurized fluid in that flow paths through the elastomer become devious because of the presence of the particles. Also, it will be appreciated that the compression of the elastomer under the influence of the pressurized fluid is not adversely affected by the particles 58 and this mechanical characteristic of the isolator to decrease fluid permeability of the elastomer is not adversely affected.

Figure 5:
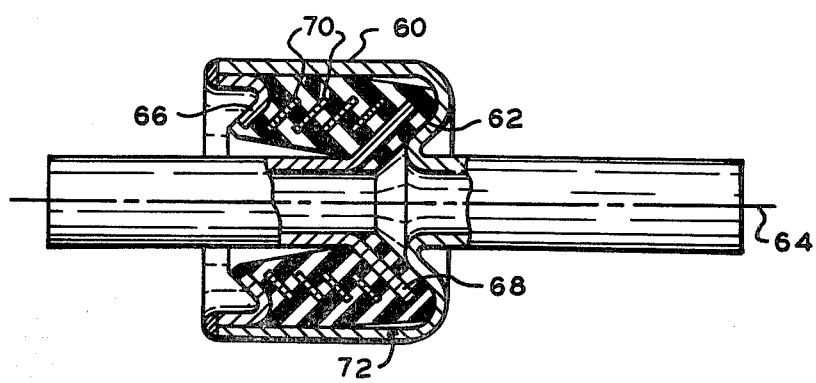
FIG. 5 is an elevational, diametrical, cross sectional view of another embodiment of the invention employing conical configurations within the cylinder and piston members, and in the stiffening rings.

In the embodiment of FIG. 5 the cylinder member 60 is similar to that previously described except that the pressure face wall 62 is angularly disposed to the axis 64 and is of a conical configuration. Likewise, the reaction wall portion 66 is complimentarily angularly disposed to the axis, as is the piston member flanged head 68, and a plurality of conical metal annular rings 70 embedded in the elastomer 72 are also so angularly disposed. The angular orientation of these components increases the length of the radial flow path of the fluid through the elastomeric material, and yet, the piston member is capable of relative movement to the left away from the wall 62 under the biasing force of the pressurized fluid to compress the elastomer adjacent the rings 70. In this embodiment the basic operational characteristics are similar to those previously described.

It will therefore be appreciated that the invention discloses a vibration and sound isolator of economical manufacture and concise configuration which is capable of ready installation in pressurized conduit systems requiring vibration and sound isolation, and wherein significant torsional vibrations may be absorbed, as well as angular deflections. Relative rotational deflections of 10° may be readily absorbed without overstressing of the elastomer or the elastomeric seal with the piston member or reaction wall, and angular deflections of 5° or more with respect to axis 20 may be readily accommodated.

It is appreciated that various modifications to the inventive concepts may be apparent to those skilled in the art without departing from the spirit and scope of the invention.

I claim:

1. A pressurized fluid conducting vibration isolator for conduit systems comprising, in combination, a hollow thin wall casing defining a chamber having an axis, and axial wall, and an inner wall transversely disposed to said axis, a conduit connection communicating with said chamber, a tubular thin wall stem having an axis coaxial with said chamber and including an inner end having an outwardly radially extending flange and an outer conduit attaching end, said stem inner end being located within said chamber with said flange axially spaced from said inner wall and radially spaced from said axial wall, an annular retainer sealed to said casing and adjacent said chamber having an annular portion transversely disposed to said casing axis and in axially spaced, opposed relationship to said stem flange, said flange being located between said retainer and casing inner wall, a vibration absorbing elastomer bonded solely to said stem at said flange and to said retainer annular portion, said elastomer being capable of movement relative to said stem and axial wall whereby said stem is capable of limited torsional and angular deflection relative to said casing axis by distortion of said elastomer and pressurized fluid intermediate said casing inner wall and stem flange compresses the elastomer intermediate said flange and retainer decreasing the fluid permeability thereof, said elastomer including an integral web bridging the flange outer diameter and further including an integral portion engaging said casing inner wall whereby said web cushions the flange against lateral approach relative to said axial wall.

2. In a pressurized fluid conducting vibration isolator for conduit systems as in claim 1, said retainer annular portion being located within said chamber.

3. In a pressurized fluid conducting vibration isolator for conduit systems as in claim 1, said elastomer having an inner radial dimension greater than the outer dimension of said stem and an outer radial dimension less than said axial wall intermediate said flange and retainer providing radial clearance between said elastomer and stem, and elastomer and casing to facilitate angular deflection of said stem relative to said casing axis.

4. In a pressurized fluid conducting vibration isolator for conduit systems as in claim 3, said retainer annular portion including an annular inner edge radially spaced from said stem, said elastomer being bonded to said inner edge interposed between said inner edge and said stem to cushion engagement of said stem and retainer during maximum stem angular deflection.

5. In a pressurized fluid conducting vibration isolator for conduit systems as in claim 1 wherein elastomer stiffening means are embedded in said elastomer to increase the axial deflection characteristics thereof about said casing axis.

6. In a pressurized fluid conducting vibration isolator for conduit systems as in claim 5 wherein said elastomer stiffening means comprises elongated fibres of synthetic material.

7. In a pressurized fluid conducting vibration isolator for conduit systems as in claim 5 wherein said elastomer stiffening means comprises granules of synthetic plastic material.

8. A vibration isolator for pressurized fluid conduit systems comprising, in combination, a cylinder member defining a chamber having an longitudinal axis, a cylindrical wall, a pressure face wall, and a reaction wall in opposed axial spaced relation to said pressure face wall, a first tubular conduit connection defined on said cylinder member communicating with said chamber at said pressure face wall, an elongated tubular piston member received within said chamber including a tubular stem extending from said chamber defining a second conduit connection and a radially extending head within said chamber in axially spaced opposed relation to said pressure face wall, an annular elastomer seal within said chamber interposed between said head and said reaction wall and sealed thereto and unsupported intermediate said head and reaction wall whereby pressurized fluid within said chamber at said pressure face wall axially biases said piston member head toward said reaction wall compressing said elastomer and decreasing the fluid permeability thereof, elastomer stiffening means embedded in said elastomer to increase the axial deflection characteristics thereof relative to said casing axis, said stiffening means comprising plate-like particles of generally planar configuration, said particles being oriented in said elastomer wherein the plane of the majority of said particles is substantially perpendicular to said casing axis.

9. A pressurized fluid conducting vibration isolator for conduit systems comprising, in combination, a hollow casing defining a chamber having an axis and an inner wall transversely disposed to said axis, a conduit connection communicating with said chamber, a tubular stem having an axis coaxial with said chamber and including an inner end having an outwardly radially extending flange and an outer conduit attaching end, said stem inner end being located within said chamber with said flange axially spaced from said inner wall, an annular retainer sealed to said casing and adjacent said chamber having an annular portion transversely disposed to said casing axis and in axially spaced, opposed relationship to said stem flange, said flange being located between said retainer and casing inner wall, a vibration absorbing elastomer bonded solely to said stem at said flange and to said retainer annular portion whereby said stem is capable of limited torsional and angular deflection relative to said casing axis by distortion of said elastomer and pressurized fluid intermediate said casing inner wall and stem flange compresses the elastomer intermediate said flange and retainer decreasing the fluid permeability thereof, and a plurality of annular spaced elastomer stiffening metal rings embedded in said elastomer intermediate said flange and retainer annular portion substantially concentric to said casing axis to increase the axial deflection characteristics of said elastomer about said casing axis, said metal rings being of a conical configuration and said casing inner wall, stem flange and retainer annular portion each being of a conical configuration having an angular orientation to said casing axis substantially corresponding to that of said conical rings.

10. A pressurized fluid conducting vibration isolator for conduit systems comprising, in combination, a hollow casing defining a chamber having an axis and an inner wall transversely disposed to said axis, a conduit connection communicating with said chamber, a tubular stem having an axis coaxial with said chamber and including an inner end having an outwardly radially extending flange and an outer conduit attaching end, said stem inner end being located within said chamber with said flange axially spaced from said inner wall, an annular retainer sealed to said casing and adjacent said chamber having an annular portion transversely disposed to said casing axis and in axially spaced, opposed relationship to said stem flange, said flange being located between said retainer and casing inner wall, a vibration absorbing elastomer bonded solely to said stem at said flange and to said retainer annular portion whereby said stem is capable of limited torsional and angular deflection relative to said casing axis by distortion of said elastomer and pressurized fluid intermediate said casing inner wall and stem flange compresses the elastomer intermediate said flange and retainer decreasing the fluid permeability thereof, elastomer stiffening means embedded in said elastomer comprising plate-like particles of generally planar configuration oriented in said elastomer wherein the plane of the majority of said particles is substantially perpendicular to said casing axis to increase the axial deflection characteristics of said elastomer about said casing axis.

\* \* \* \* \*